US008225409B2

(12) United States Patent
Newman et al.

(10) Patent No.: US 8,225,409 B2
(45) Date of Patent: Jul. 17, 2012

(54) SECURITY CONTROL VERIFICATION AND MONITORING SUBSYSTEM FOR USE IN A COMPUTER INFORMATION DATABASE SYSTEM

(75) Inventors: Gary H. Newman, Concord, MA (US); Richard M. DeFuria, Acton, MA (US)

(73) Assignee: Belarc, Inc., Maynard, MA (US)

( * ) Notice: Subject to any disclaimer, the term of this patent is extended or adjusted under 35 U.S.C. 154(b) by 941 days.

(21) Appl. No.: 11/387,424

(22) Filed: Mar. 23, 2006

(65) Prior Publication Data

US 2006/0218639 A1    Sep. 28, 2006

Related U.S. Application Data

(60) Provisional application No. 60/664,318, filed on Mar. 23, 2005.

(51) Int. Cl.
*G06F 21/00* (2006.01)
(52) U.S. Cl. .................. 726/25; 726/26; 709/224
(58) Field of Classification Search .............. 726/25, 726/26; 709/224
See application file for complete search history.

(56) References Cited

U.S. PATENT DOCUMENTS

| | | | |
|---|---|---|---|
| 6,185,689 B1 * | 2/2001 | Todd et al. ............... | 726/25 |
| 6,298,445 B1 * | 10/2001 | Shostack et al. ............... | 726/25 |
| 6,535,227 B1 * | 3/2003 | Fox et al. ............... | 715/736 |
| 6,574,737 B1 * | 6/2003 | Kingsford et al. ............... | 726/25 |
| 2002/0066033 A1 * | 5/2002 | Dobbins et al. ............... | 713/201 |
| 2002/0198750 A1 * | 12/2002 | Innes et al. ............... | 705/7 |
| 2003/0140246 A1 * | 7/2003 | Kammer et al. ............... | 713/201 |
| 2003/0236994 A1 * | 12/2003 | Cedar et al. ............... | 713/200 |
| 2006/0112416 A1 * | 5/2006 | Ohta et al. ............... | 726/1 |

FOREIGN PATENT DOCUMENTS
WO    WO 02/03178    1/2002

OTHER PUBLICATIONS

Kreitner C: "The Development and Proliferation of Consensus Security Configuration Benchmarks for Systems Connected to the Internet" System Sciences, 2003. Proceedings of the 36th Annual Hawaii International Conference on Jan. 6-9, 2003, Piscataway, NJ, USA, IEEE, Jan. 6, 2003, pp. 204-213.

(Continued)

*Primary Examiner* — Edan Orgad
*Assistant Examiner* — Brian Olion
(74) *Attorney, Agent, or Firm* — Cesari and McKenna, LLP; Patricia A. Sheehan

(57) ABSTRACT

A security control verification and monitoring subsystem of a managed computer system performs security control verification operations regularly and for each security control verification operation determines the applicable security benchmark level for use by a given computer. The subsystem assigns security risk categories to groups of computers based, for example, on overall system or group administrator supplied potential impact settings and/or system type and business or information type selections. The subsystem further associates the security risk categories with security benchmark levels based on mapping information supplied by the overall system or group administrator. The subsystem then directs the computer to benchmark definition files based on the assigned security risk category, the associated security benchmark level and attributes of the computer. The subsystem performs the security control verification operations whenever the computer performs computer profile data update operations, and thus, monitors essentially continuously the security control compliance of the computer. The subsystem stores the results of the security verification operations and includes the results in reports for the system, group or computer.

23 Claims, 10 Drawing Sheets

OTHER PUBLICATIONS

Van Der Haar H. et al: "A Model for Deriving Information Security Control Attribute Profiles" Computers & Security, Elsevier Science Publishers. Amsterdam, NL, vol. 22, No. 3, Apr. 2003, pp. 233-244.

National Institute of Standards and Technology: "Standards for Security Categorization of Federal Information and Information Systems" FIPS PUB 199, Federal Information Processing Standards Publication, Feb. 2004, pp. I-7.

Tian H.T. et al.: "Arm up Administrators: Automated Vulnerability Management" Parallel Architectures, Algorithms and Networks, 2004. Proceedings. 7th International Symposium on Hong Kong May 10-12, 2004, Piscataway, NJ, USA, IEEE, May 10, 2004, pp. 587-593.

Martin R.A.: Institute of Electrical and Electronics Engineers: "Integrating Your Information Security Vulnerability Management Capabilities Through Industry Standards (CVE and OVAL)" 2003 IEEE International Conference on Systems, Man and Cybernetics. SMC '03. Confere4nce Proceedings, Washington, DC, Oct. 5-8, 2003, IEEE International Conference on Systems, Man, and Cybernetics, New York, NY: IE.., US, vol. 5 of 5, Oct. 5, 2003, pp. 1528-1533.

* cited by examiner

MACHINE GROUP TABLE

| GROUP ID | GROUP NAME | RISK CATEGORY |
|---|---|---|
|  |  |  |
|  |  |  |
|  |  |  |

FIG. 2

POTENTIAL IMPACT TABLE — 330

| POTENTIAL IMPACT | RISK CATEGORY |
|---|---|
| NOT CATEGORIZED | 0 |
| LOW | 10 |
| MODERATE | 20 |
| HIGH | 30 |

BENCHMARK SECURITY LEVEL TABLE — 350

| GROUP ID | RISK CATEGORY | BENCHMARK SECURITY LEVEL |
|---|---|---|
| 23 | 10 | LEGACY |
| 23 | 20 | ENTERPRISE |
| 23 | 30 | HIGH SECURITY |
| 33 | 10 | ENTERPRISE |
| 33 | 20 | ENTERPRISE |
| 33 | 30 | HIGH SECURITY |

*FIG. 4*

BENCHMARK RESULTS TABLE

| UUID | START TIME | END TIME | BENCHMARK | BENCHMARK COMPONENT A | BENCHMARK COMPONENT B | BENCHMARK COMPONENT C | ... | BENCHMARK COMPONENT i |
|------|------------|----------|-----------|----------------------|----------------------|----------------------|-----|----------------------|
|      |            |          |           |                      |                      |                      |     |                      |

Categorize Systems Administration Page

Select Benchmarks Administration Page

FIG. 7

Security Control Verification Report

Security Control Verification by Computer

*Computer Name:* W2k3cistest-dc (In CISTEST)
*Group:* belarc\TestProfiles\
*Profile Date:* Thursday, February 03, 2005 09:19:00 AM -0500
*Windows Logon:* belarc-admin
*Client Version:* 7.0h

Score: 6.87 of 10

Risk Category: Low

Benchmark: CIS Win2003 Domain Controller Legacy version 1.1

Benchmark Results by Section and Setting (• = Pass, X = Fail):

- Current Service Pack
  - 1. Latest Service Pack

- Critical and Security Hotfixes
  - 1. Latest Critical and Security Hotfixes

- Password Policies
  - 1. Current Password Ages
  - 2. Minimum Password Length

- Audit and Account Policies
  - 1. Audit Account Logon Events
  - 2. Audit Account Management
  - 3. Audit Logon Events
  - 4. Audit Object Access
  - 5. Audit Policy Change
  - 6. Audit System Events
  - 7. Minimum Password Age
  - 8. Maximum Password Age
  - 9. Password Complexity
  - 10. Store Passwords using Reversible Encryption
  - 11. Password History Size
  - 12. Account Lockout Duration
  - 13. Account Lockout Threshold
  - 14. Reset Account Lockout Count Time

SECURITY CONTROL VERIFICATION AND MONITORING SUBSYSTEM FOR USE IN A COMPUTER INFORMATION DATABASE SYSTEM

CROSS-REFERENCE TO RELATED APPLICATIONS

The present application claims the benefit of U.S. Provisional Patent Application Ser. No. 60/664,318, which was filed on Mar. 23, 2005, by Gary H. Newman and is hereby incorporated by reference.

BACKGROUND OF THE INVENTION

1. Field of the Invention

The invention relates generally to systems and methods of verifying and monitoring security controls for a plurality of managed computers.

2. Background Information

Computer system security controls are particularly important in computer systems used in businesses in light of the heightened risk of damage to or compromise of the respective computers and/or the data stored thereon from intruders to the system. The damage may incapacitate individual computers, corrupt or release data stored thereon and/or compromise the company and/or individuals, both inside or outside of the company, that supplied or produced the data. The intruders may be viruses, malicious or non-malicious hackers, and so forth. While computer operating systems generally have certain built-in security control features, the features may be overridden, ignored or turned off.

The United States government has published recommended security controls for information systems. See, NIST Special Publication 800-53, "Recommended Security Controls for Federal Information Systems" and FIPS Publication 199, "Standards For Security Categorization of Federal Information and Information Systems" published by the U.S. National Institute of Standards and Technology. In addition, an overall system or group administrator may devise more or less stringent security controls for individual computers or groups of computers, depending in part on what type of data are stored on or manipulated by the respective computers.

To ensure that the organization as a whole, and also its respective groups, are operating in a manner that complies with the applicable federal and/or system administration security control requirements, the respective computers must be individually checked. Thus, the security control settings of the individual computers must be compared to applicable security benchmarks, to determine if the settings are in compliance. Further, to ensure continuing compliance, the security control settings of the respective computers should be individually re-checked against the applicable security control requirements on a regular basis.

The task of determining if the appropriate security controls are in place on the respective computers is not only time consuming but complex, particularly when the security control requirements may vary by group and computers may at any time be added to various groups or re-assigned among the different groups. The task of ensuring that the security controls are in place is made even more difficult by users who, at various times, modify the operations of their respective computers by installing applications and in doing so change, for example, security control settings for the file system, services, user accounts, and so forth. In addition, changes to the computers, such as installing operating system service packs, are problematic to security control verification since different benchmarks may apply. Further, the operations of a given group may change, such that different types of data are stored on or utilized by the member computers, and thus, different security control requirements should be used by the computers in future security verification operations.

Accordingly, there is a need to associate the appropriate collection of desired security control settings or benchmarks with the respective groups and verify compliance of the individual member computers with the appropriate security control benchmarks. Further, there is a need for continuous monitoring of the compliance of the individual computers, to ensure that changes to the group memberships and/or to individual computers do not result in a failure to meet the applicable security control benchmarks.

The inventive security control verification and monitoring subsystem described herein operates in a managed computer system in which clients at the respective computers, or administrators and scripts using a clientless profiling application, send to a server computer profiles that include computer configuration data, such as data that identifies the computer hardware and software. The profile may also include other information, such as, for example, associated software license information, performance data, and other user specified data. The server includes the profile data in a computer information database and manages the data according to a tree-structured grouping of the computers. The tree structure, which is designated by the system administrator, may, for example, follow the organizational chart of a company, with the top level node, or group, corresponding to the company and lower level nodes, or groups, corresponding to the various branch offices, and so forth. As an example, the computers may be grouped according to their IP subnets that correspond to company branch offices.

The server manipulates the profile data to produce reports that summarize the attributes of the computers at every group level, with reports for a given group including the profile data for all computers in the sub-tree that has the group as its root. One such computer information database management system is the BelManage system (version 6) produced by Belarc, Inc., of Maynard, Mass., which is the Assignee of the current invention.

SUMMARY OF THE INVENTION

The current system includes a security control verification and monitoring subsystem that associates appropriate security control benchmarks with the respective computers and both verifies and continuously monitors compliance of the computers with the benchmarks, through a modification of the computer profile data reporting operations.

The security control verification and monitoring subsystem includes a security categorization operation through which the organization's information security officers or an overall administrator and, as appropriate, group administrators, assign security risk categories to the respective groups. The security risk category corresponds to the potential impact on the operations of the system or group, and/or on the assets of the company and/or of individuals within or outside of the company should there be a breach in security that results in a loss of the confidentiality, integrity or availability of data maintained in or manipulated by the respective computers. The security risk categories, namely, low-impact, moderate-impact or high-impact, match those of FIPS Publication 199.

For purposes of assigning the security risk categories to the respective computers, the subsystem treats in the same group for security control purposes the computers that comprise an "information system," based on the definition of system contained in OMB Circular A-130, Appendix III. Specifically, a system is defined as "an interconnected set of information resources under the same direct management control which shares common functionality." The security categorization operation elicits from the system or group administrator, through a series of GUIs, information that allows the subsystem to separately assign security control risk categories to the respective "information systems" within the company. As discussed in more detail below, the groups of the tree structure of computer groups preferably correspond to information systems.

As also discussed in more detail below, the security control verification and monitoring subsystem selects benchmarks for the respective computers based on the associated security risk classifications, as well as on the attributes of the computers, such as, for example, the computers' operating systems. The subsystem may use benchmarks that are specified by the Center for Internet Security ("CIS") for the different security control levels and computer operating systems. Alternatively, or in addition, the subsystem may use custom benchmarks that are specific to the company.

The security control verification and monitoring subsystem directs a given computer, through a handshake operation, to perform a security control verification operation that consists of comparing the computer's security control settings to the appropriate benchmark. Alternatively, an administrator or script invokes a clientless profiling application that performs the security control verification operation as it creates a profile of the computer. After each security verification operation, the subsystem retains the results of the comparison as a record that indicates, for the various components of the applicable benchmark, whether the computer passed or failed. The subsystem preferably includes the pass/fail information in a managed computer information database and thereafter incorporates the results into reports prepared for the system, respective groups and/or the individual computers.

The security control verification and monitoring subsystem also continuously monitors the compliance of the computers with the applicable security control benchmarks by requiring each computer to perform the security verification operations as part of the periodic, preferably daily, operations performed to update the computer profile data contained in the computer information database. As part of each security control verification operation, the system determines for the individual computer which security benchmark is then applicable, and thus, the security control settings of each computer are tested against the appropriate benchmark's settings to verify compliance with the desired security control level.

BRIEF DESCRIPTION OF THE DRAWINGS

The invention description below refers to the accompanying drawings, of which:

FIG. 2 depicts a Machine Groups Table for use by the system of FIG. 1;

FIG. 4 depicts a Benchmark Table for use by the system of FIG. 1;

FIG. 5 depicts a Benchmark Results Table for use by the system of FIG. 1;

FIGS. 8-9 illustrate security control verification reports that are produced by the system of FIG. 1; and FIG. 10 illustrates an administrative web page for overriding a baseline risk category by computer.

DETAILED DESCRIPTION OF AN ILLUSTRATIVE EMBODIMENT

Figure 1:
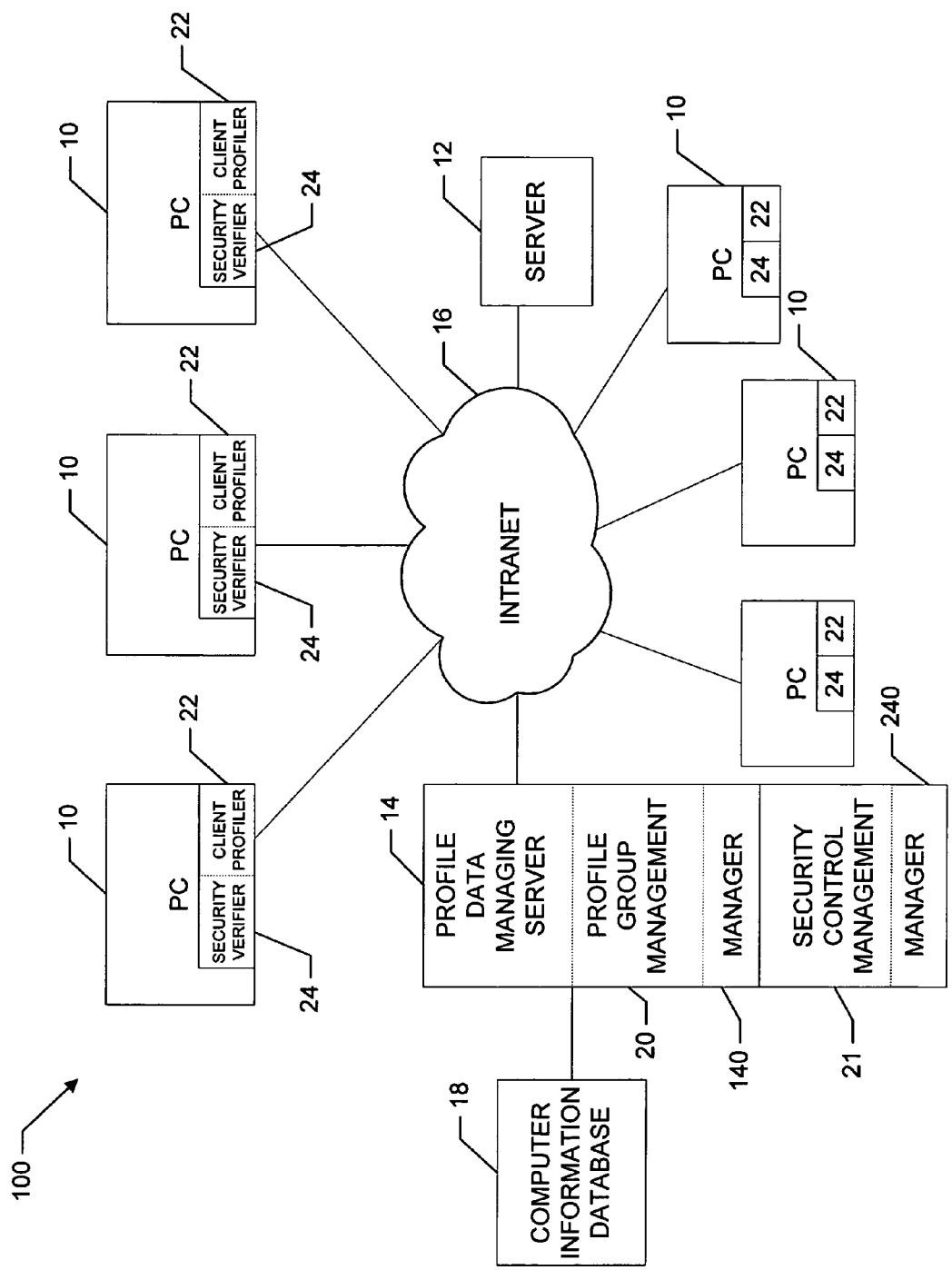
FIG. 1 is a functional block diagram of a system constructed in accordance with the current invention.

Referring now to FIG. 1, a company operates a network 100 that includes various computers 10, some of which may be workstations, laptops, servers or other devices (not shown) that communicate over an intranet, which is denoted in the drawing by the reference numeral 16. A server 14, which is the profile data managing server, manages a computer information database 18 that contains profile data for the computers on the intranet 16 and any other computers (not shown) that are under company control. Hereinafter, all computers under control of the company are referenced as "computers 10." The server 14 runs profile group management software, which is denoted in the drawing by the reference numeral 20, and security control management software, which is denoted by the reference numeral 21. For ease of understanding, the server 14 will sometimes be referred to herein as a profile group manager 140 and/or a security control manager 240 as depicted by dotted lines in the drawing.

The computers 10 run client profiling software that, at the respective computers, collects profile data and uploads the data to the profile data managing server 14. The client profiling software, referred to herein also as the client profiler, is denoted in the drawing by the reference numeral 22. As discussed in more detail below, the client profiling software performs a security verification operation as part of the profile updating operations. The security verification operation is denoted in the drawing by the reference numeral 24 and also referred to herein as the security verifier. The security verifier provides results of the security verification as pass/fail data. The client profiler incorporates the pass/fail data into the computer profile data that are provided to the profile group manager 140.

The profile group manager 140 manages the computer profile data by grouping the computers into a specified tree-structure of groups, possibly based on primary and/or secondary grouping criteria, or in accordance with manual grouping dictated by the system administrator. The profile group manager then manipulates the data to produce reports that summarize the attributes of the computers in the various groups, with each report for a given group summarizing the attributes of the computers in the groups that are in a sub-tree with the given group as its root.

The security control verification and monitoring subsystem includes components of the security control manager 240, the security verifier 24 and the client profiler 22.

Typically, the computer groups conform to "information systems" as defined by OMB Circular A-130, Appendix III because the selection criteria essentially identify organizational, and thus, managerial, divisions, departments and so forth within the company. The groups may be based on primary and secondary grouping criteria as described in the co-pending United States Patent Publication 2004/0236728 entitled GROUPING OF COMPUTERS IN A COMPUTER INFORMATION DATABASE SYSTEM, which is assigned to a common Assignee. The grouping criteria or manual grouping may produce groups that essentially correspond to the underlying organization of the network 100 and/or the company. An example of computer groupings that correspond to the underlying organization of a company is a company-wide group, branch office or regional groups, department groups within each of the respective branch offices groups, and so forth, as discussed in the co-pending application. The profile group manager 140 may thus group the computers into separate groups for east and west regional offices, and further for sales and marketing departments. The groups are then:

Company/West/
Company/West/Sales/
Company/West/Marketing/
Company/East/
Company/East/Sales/
Company/East/Marketing/

The profile group manager produces reports organized by the company, by regional groups and by the respective sales and marketing department groups. The reports for the East group include information relating to the computers in groups that are in the sub-tree with the East group as its root. Thus, the report includes information relating to the East/Sales and East/Marketing groups and any subgroups thereof.

For ease of understanding, the operations of the security control verification and monitoring subsystem are explained with reference to a Machine Group Table 300 (FIG. 2) that specifies for each group the assigned risk category, and a Benchmark Security Level Table 350 (FIG. 4) that associates the risk categories with benchmarks that are used for the security verification operations. As is evident to those skilled in the art, one or both of the tables may consist of multiple tables, or may take any other form that associates a given GroupId with both the assigned risk category and the associated benchmark security level. Before discussing how the assignments and associations are made, the tables and the use of the tables in a security control verification operation is discussed.

Figure 2:
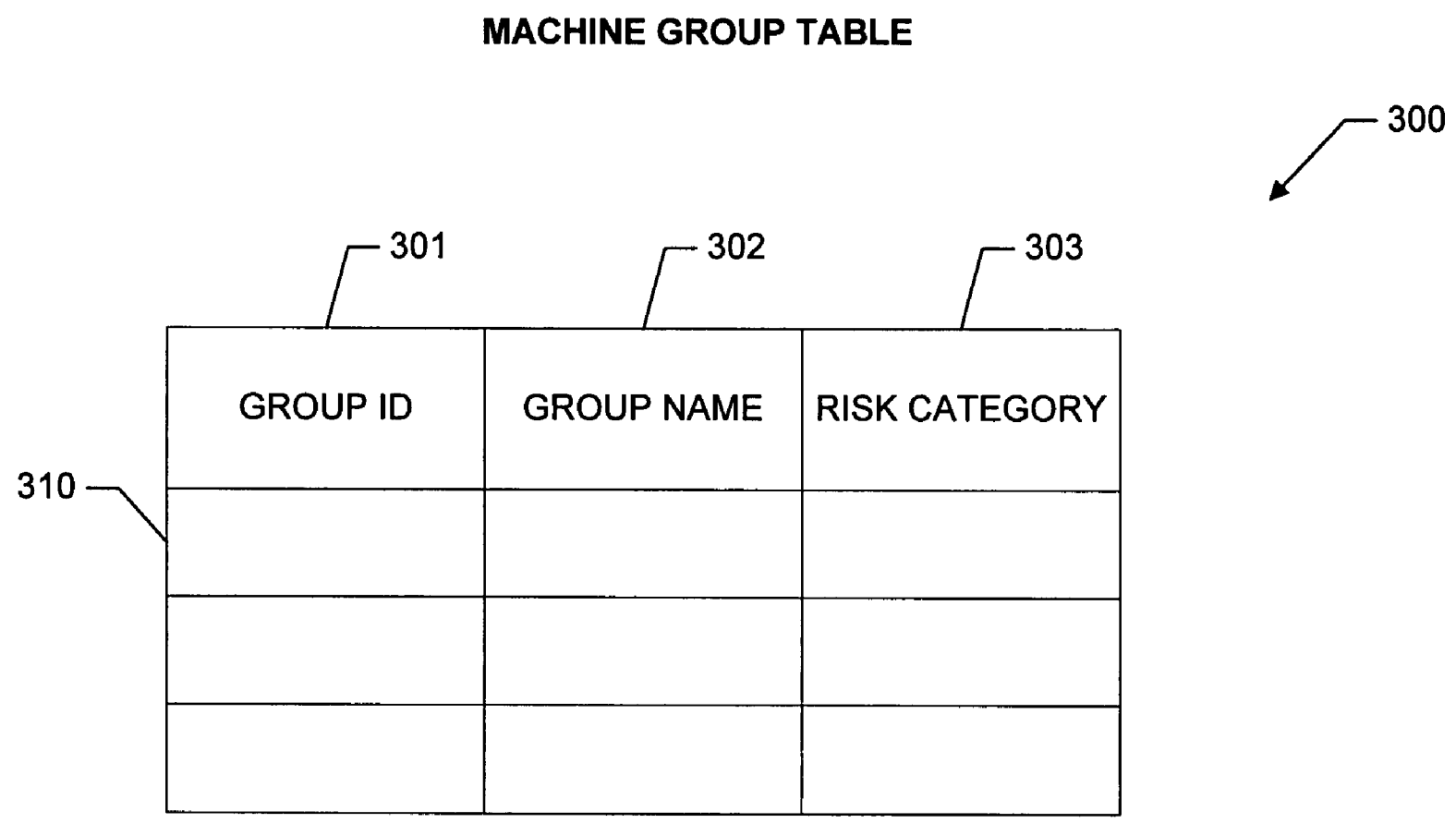
Figure 3:
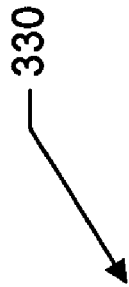
FIG. 3 depicts a Potential Impact Table for use by the system of FIG. 1.

Referring now to FIGS. 2-4, a Machine Group Table 300 stores records for the computer groups and associates the respective groups with the risk categories that are assigned to the groups. The table has one record 310 per group. The drawing depicts fields that are of particular interest to the security control verification and monitoring subsystem, namely, a GroupId field 301, a Group Name field 302 and a Risk Category field 303. The record for a given group requires entries in each of the fields 301-303. The default entry for the risk category corresponds to a "not categorized" level, which indicates that the overall administrator or, as appropriate, the group administrator, has not yet assigned a security risk category to the group.

A Potential Impact Table 330 associates risk categories with respective potential impact settings. The potential impact settings, which are associated with the potential impact scenarios set forth in FIPS Publication 199, are selected for the group by the system or group administrator as discussed in more detail below. The subsystem then assigns the risk categories to the groups based on the selected potential impact settings.

The subsystem further associates the risk categories with, in the example, CIS benchmark security levels of Legacy, Enterprise and High Security as depicted in the Benchmark Security Level Table 350. The table contains for each group three records 351 that respectively associate the three risk categories (low-impact, moderate-impact and high-impact) with respective benchmark security levels. By default, the subsystem maps the low-impact setting with the CIS Legacy benchmark security level, the moderate-impact with the CIS Enterprise benchmark security level and the high-impact setting with the CIS High Security benchmark security level. Further, the system, by default, does not associate the benchmark security levels with the groups that are assigned the "not categorized" risk category, and thus, these groups are not tested for security control compliance. The overall administrator or group administrator can thus selectively omit from the security compliance testing the groups that do not, for example, handle particularly sensitive information or information that is critical to the operations of the company. As discussed later in more detail, a group or overall system administrator may override the default mappings and associate a particular risk category with either a different CIS benchmark security level or a benchmark security level that corresponds to a customized, company specific benchmark.

The Benchmark Security Level Table 350 includes a field 354 for the GroupId, and fields 356 and 358 for the assigned risk categories and associated benchmark security levels, respectively. In the example, the East Group, with GroupId 23, utilizes the default mapping, while the West Group, with GroupId 33, utilizes a non-default mapping.

When a computer 10 undertakes a computer profile update operation, the client profiler 22 resident on the computer performs a handshake with the server 14. As part of the handshake, the client profiler provides the computer Id, which is the Universally Unique Identifier (UUID) found on the motherboard of the computer. The client profiler further provides the Group Identifier of the group to which the computer is assigned. The server 14, and in particular, the security control manager 240, uses the Group Identifier to retrieve from the Machine Group Table 300 a record 310 for the identified group.

The security control manager 240 uses the Risk Category and the GroupId values from the retrieved record 310 to enter the Benchmark Security Level Table 350 and retrieve therefrom a corresponding record 351 that specifies the associated benchmark security level. The security control manager next informs the computer 10, more specifically the resident security verifier 24, which benchmark security level applies to the security compliance testing. The security verifier then retrieves the benchmark definition files that correspond both to the indicated benchmark security level and to the computer's operating system and other attributes, such as, for example, whether a the computer is a notebook or portable computer, and so forth. Alternatively, the security control manager may determine which operating system the computer is using and the other attributes of interest from the associated computer profile data stored in the computer information database 18, and direct the security verifier to use the appropriate benchmark definition files.

If, for example, the computer is a member of a group that is associated with an Enterprise benchmark security level and the computer is a desktop that runs Windows XP, the applicable benchmark is the CIS Enterprise Desktop Benchmark for Windows XP. Another computer in the same group may use the CIS Enterprise Benchmark for Mobile devices, and so forth. If a particular benchmark level, for example, Enterprise, is not specified for the operating system used by the computer, the security verifier 24 retrieves the benchmark definition files for the next higher available benchmark security level that is associated with the operating system.

The security verifier 24 uses the security control verification details that are contained in the benchmark definition files to determine whether the security control settings on the computer comply with the corresponding settings of the applicable benchmark. The security verifier supplies the benchmark setting pass/fail compliance results to the client profiler 22, which includes them in the profile data that are provided to the server 14. For ease of understanding, the benchmark settings are also referred to hereinafter as "benchmark components."

More specifically, the security verifier 24 reads the security control verification details from the benchmark definition files. The security verifier then checks the specified control settings on the computer, to determine if the computer complies with the respective benchmark components. For example, the benchmark might require that the Windows Security Password Policy for Minimum Password Length be set to a value greater than or equal to eight characters. The security verifier determines if the computer passes or fails compliance with this component of the benchmark by calling the Windows API to retrieve the current setting of that policy. If the retrieved value is greater than or equal to eight, the setting is compliant and so passes, otherwise it fails. The security verifier continues checking the appropriate security control settings against the benchmark components and when all are checked, sends a pass/fail vector with entries for the respective components to the client profiler 22. As is understood by those skilled in the art, the security verifier may instead send the results directly to the security control manager 240.

The security control verification and monitoring subsystem stores records of the security control verification results for the respective computers in a Benchmark Results table 500 (FIG. 5). The table includes one record 510 per computer for each data/time interval of interest. As shown in the drawing, the Benchmark Results table includes a UUID field 520, Start time and End time fields 522-523, a Benchmark field 524 and Benchmark Component fields 526 that correspond, respectively, to the components of the applicable benchmark. The benchmark field 524 of the Benchmark Results table 500 contains an integer that corresponds to the particular benchmark used. As discussed, the benchmark that is used for the security control verification operation corresponds not only to the risk category assigned to the group of which the computer is a member but also to the characteristics of the computer. Accordingly, different computers in the same group may have different entries in the benchmark field 524. The fields 526 record the compliance pass/fail results for the respective benchmark components.

Figure 6:
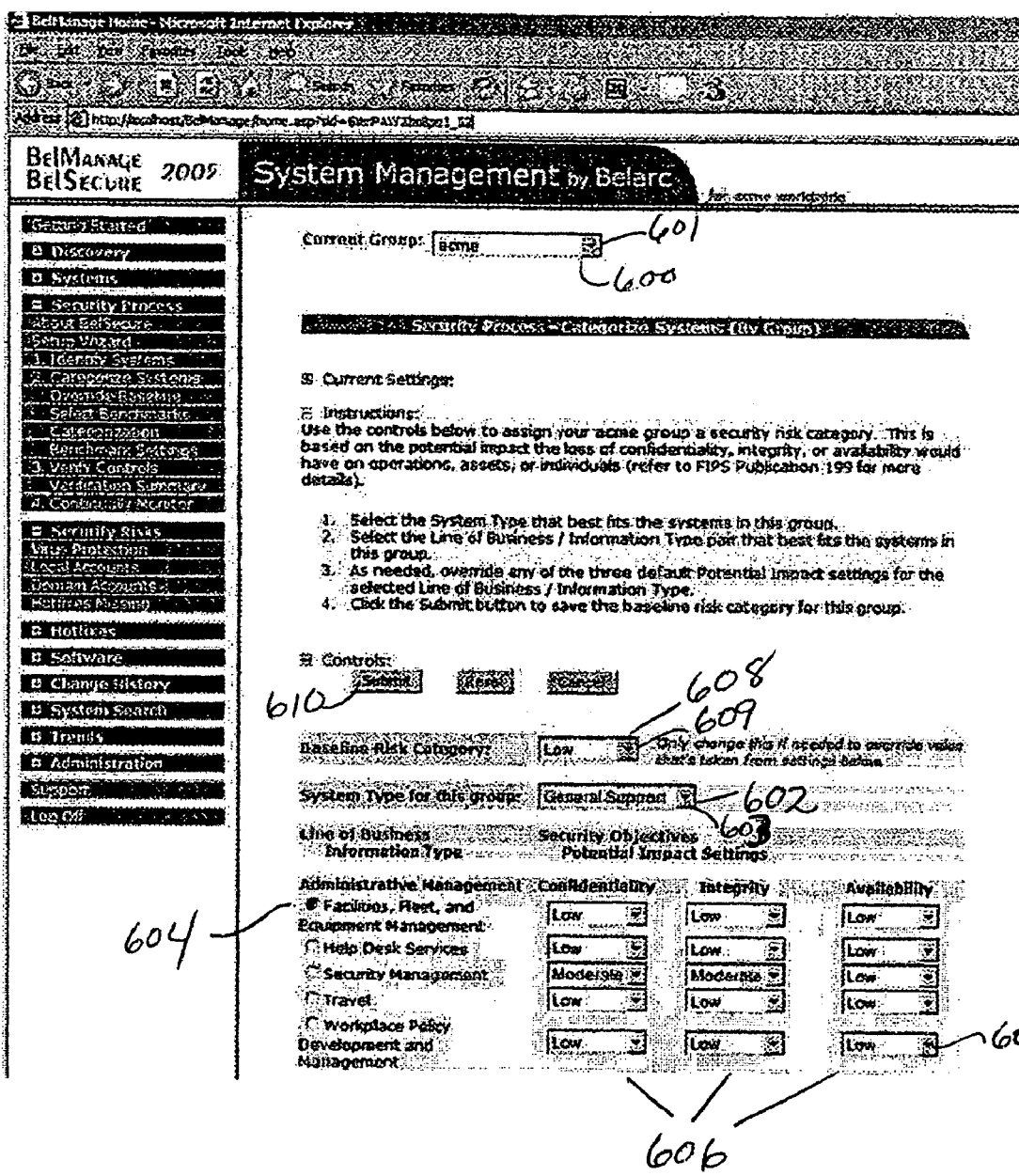
FIGS. 6-7 illustrate administrative web pages with selections for use in assigning a risk category and a benchmark security level to a group.

To establish which benchmark security level is appropriate for a given group, the security control manager 240 presents to the system administrator or, as appropriate a group administrator that has the appropriate authority, a Security Categorization administrative web page (FIG. 6) through which the administrator supplies information that is then used by the security control manager to assign a security risk category to a selected group. In the example the selected group is the Acme group as shown in box 600. The particular group is selected from a list of all groups using a pull down menu 601. Referring still to FIG. 6, when the web page first appears, the script lists in boxes 606 the default Potential Impact Settings for Confidentiality, Integrity and Availability for all of the line of business/information types. The default settings are those specified in FIPS Publication 199.

The administrator selects a System Type, using a pull down menu 602, and a Line of Business/Information Type by "clicking" on the appropriate "radio button" control indicator 604. The web page script then sets the Baseline Risk Category (shown in box 608), to the default setting that matches the highest level of the applicable potential impact settings in accordance with the requirements of FIPS Publication 199. The System Type selection alone does not change the Baseline Risk Category from the default setting.

The administrator may override the various potential impact settings using associated pulldown menus 607, 609. For example, the administrator of a group that handles data which is categorized as Facilities, Fleet and Equipment Management may select a higher setting for Availability, to coincide with the particular consequences to the company and/or associated individuals should the particular data stored in or manipulated by the computers in the group be unavailable when needed. The change in the Availability setting from the default value Low (as shown) to Moderate results in the Baseline Risk Category changing to the Moderate value, to match the new potential impact setting. When the selected settings are submitted for the group using the submit button 610, the security manager 240 saves the line of business/ information type and system type selections as well as the potential impact settings for the selected business/information type and system type. The security control manager also updates the Risk Category field 303 in the corresponding group record 310 in the Machine Group Table 300 (FIG. 2) accordingly. When the Security Categorization web page is next opened, the security manager uses the saved selections and potential impact settings to re-populate the page for the selected group, with the potential impact settings for the remaining, non-selected, system and business/information types listed on the page as the default settings.

Figure 7:
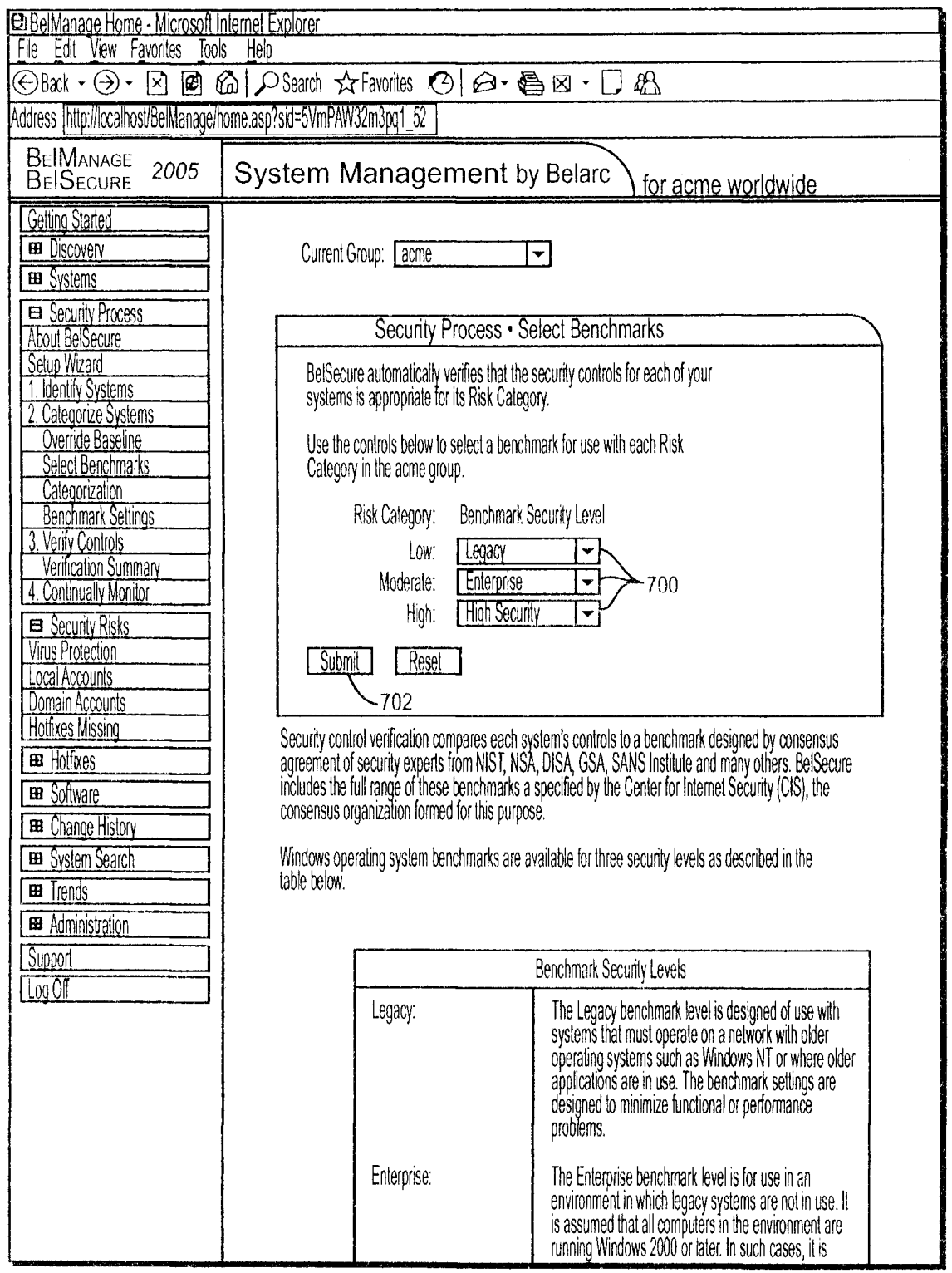
Figure 9:
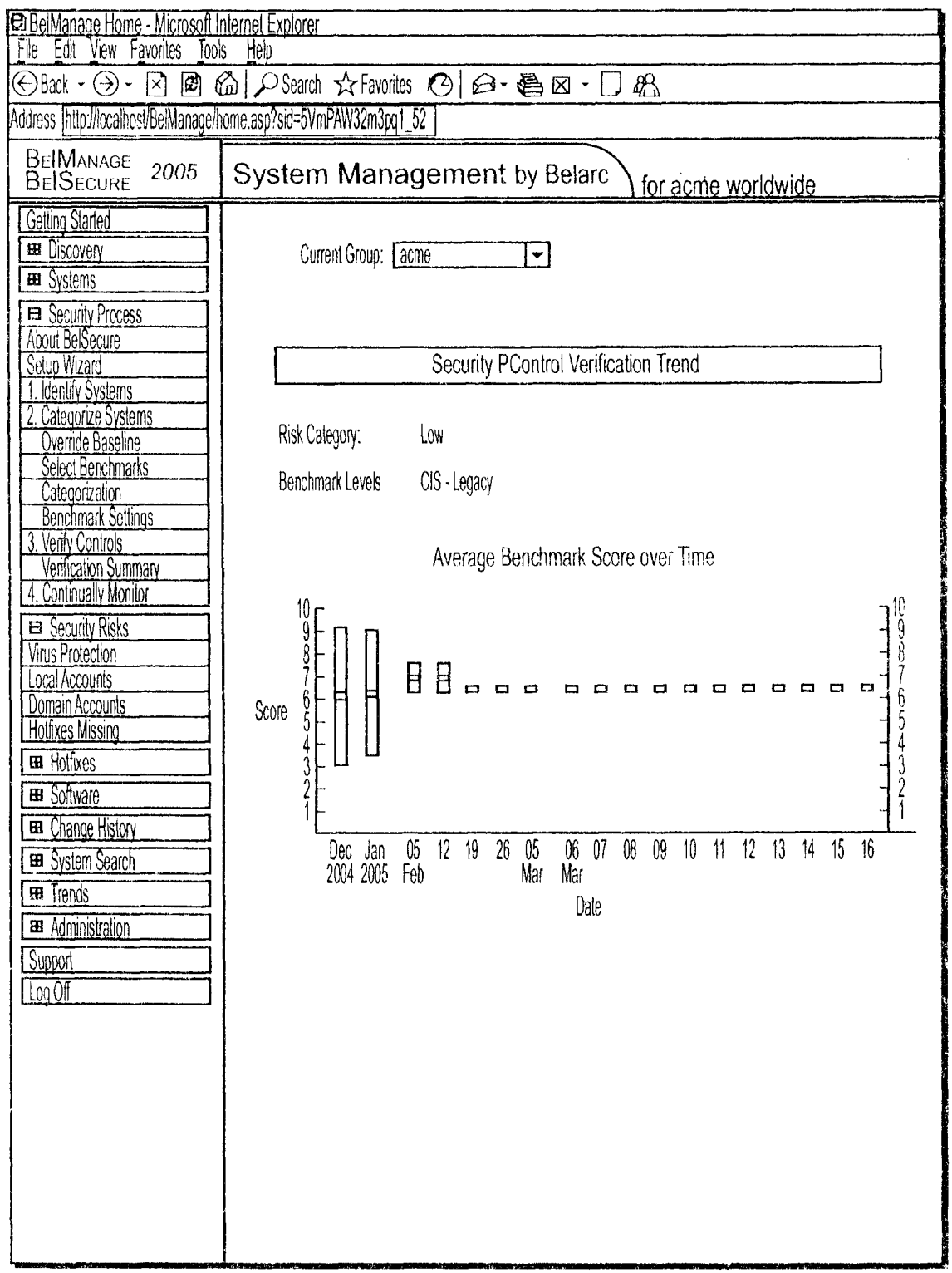

Referring now to FIG. 7, an administrator can change the mapping of risk categories to benchmark security levels using the Select Benchmarks administrative baseline web page. The web page script allows the administrator to link a selected risk category with any CIS benchmark security level or with a preprogrammed custom benchmark security level. The administrator thus uses pull down menus 700 to link the risk categories with particular benchmark security levels, and clicks on the submit button 702. The customized benchmark security level may correspond, for example, to particular application software used in the "information system" and may include additional components or values that differ from the CIS guidelines for various benchmark components. The overall system or group administrator may, as desired for a given group, change the mapping for one or more of the risk categories, depending in part on the type of data stored in or manipulated by the computers in the group.

Once all of the settings for the assignment of the baseline risk categories and the mapping of the risk categories to the benchmark security levels are submitted by the overall system or group administrators, the subsystem directs the respective computers 10, that is, the resident security verifiers 24, to use the information from the benchmark definition files that correspond to the appropriate benchmark security levels to perform the next security verification operations. The client profilers 22 may then include in the profile data they send to the server 14 the pass/fail results of the security control verification operations. The server thereafter includes the pass/ fail data in the reports provided to the groups.

Figure 9:
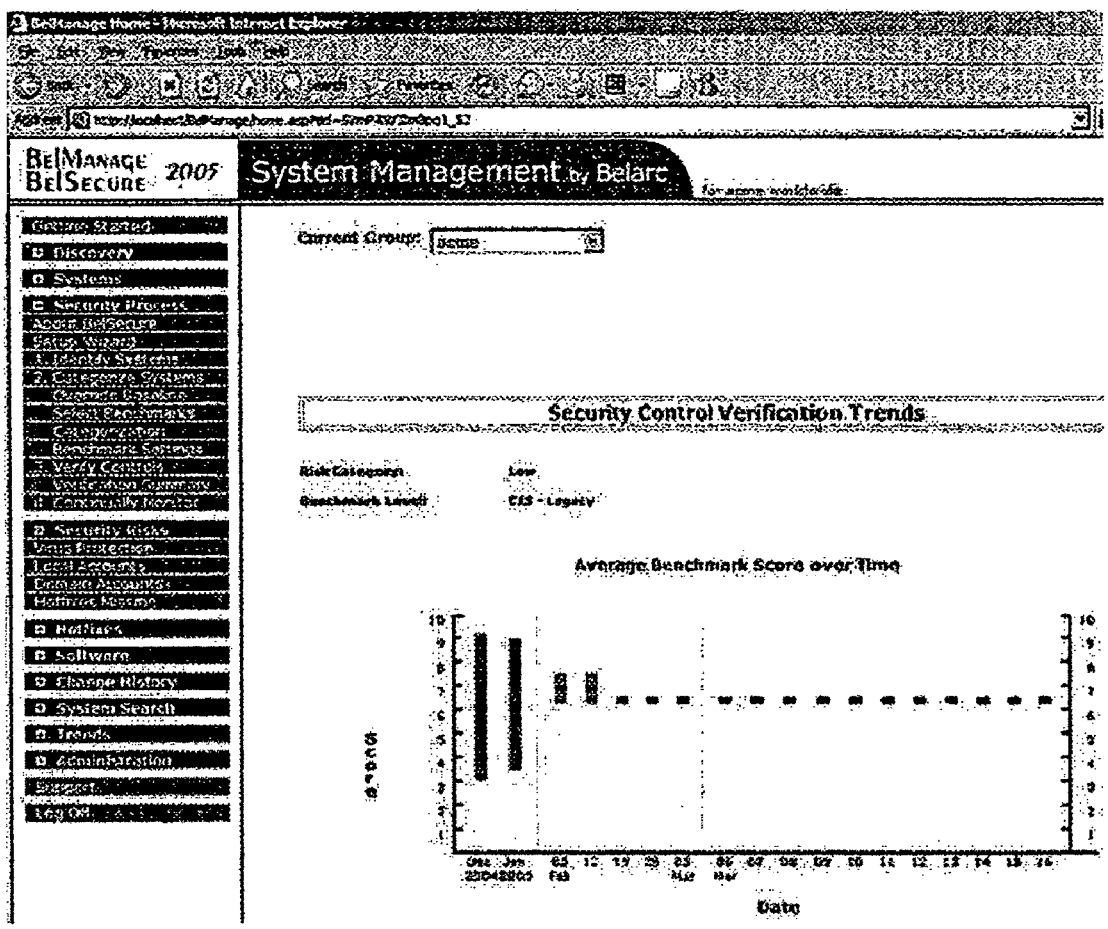

The system may, for example, produce a report for an individual computer, such as shown in FIG. 8. Alternatively, or in addition, the system may produce a report for the group, and summarize the results for the computers in the group. As shown in FIG. 9, the system may produce reports that summarize the results for the group over time as a bar graph with overall score on the vertical axis and date on the horizontal axis. The scores for the group in, for example, December and January are summarized by month, while the more current information for later months are summarized by particular days. Thus, an administrator can determine at a glance to what degree the group is complying with the applicable security control benchmarks.

The assignments of the benchmark security levels can be updated at any time and readily applied to the computers 10 using the various tables and benchmark definition files. Further, compliance with the updated security control requirements is continuously monitored during the periodic, in the example daily, updating of the client profile data. Accordingly, the security controls of computers that are new to the system can be verified and monitored as soon as the computer is assigned to a group. Further, the security controls of a computer that is moved from one group to another can be verified against the benchmark that is assigned to the new group as soon as the computer is operational in the new group.

The security verification reports generated by the security control verification and monitoring subsystem can be viewed for an individual computer, detailing the passing or failing of the various benchmark components, or as group summaries, or as a report as shown in FIGS. 8 and 9. Further, the subsystem may generate reports that show or summarize the pass/fail details for all computers in a group, and so forth. The reports thus inform the overall system and/or group administrators how the system, groups and/or computers comply with the applicable security control benchmarks and, as desired, which of the benchmark components contribute to the compliance or lack thereof.

Figure 10:
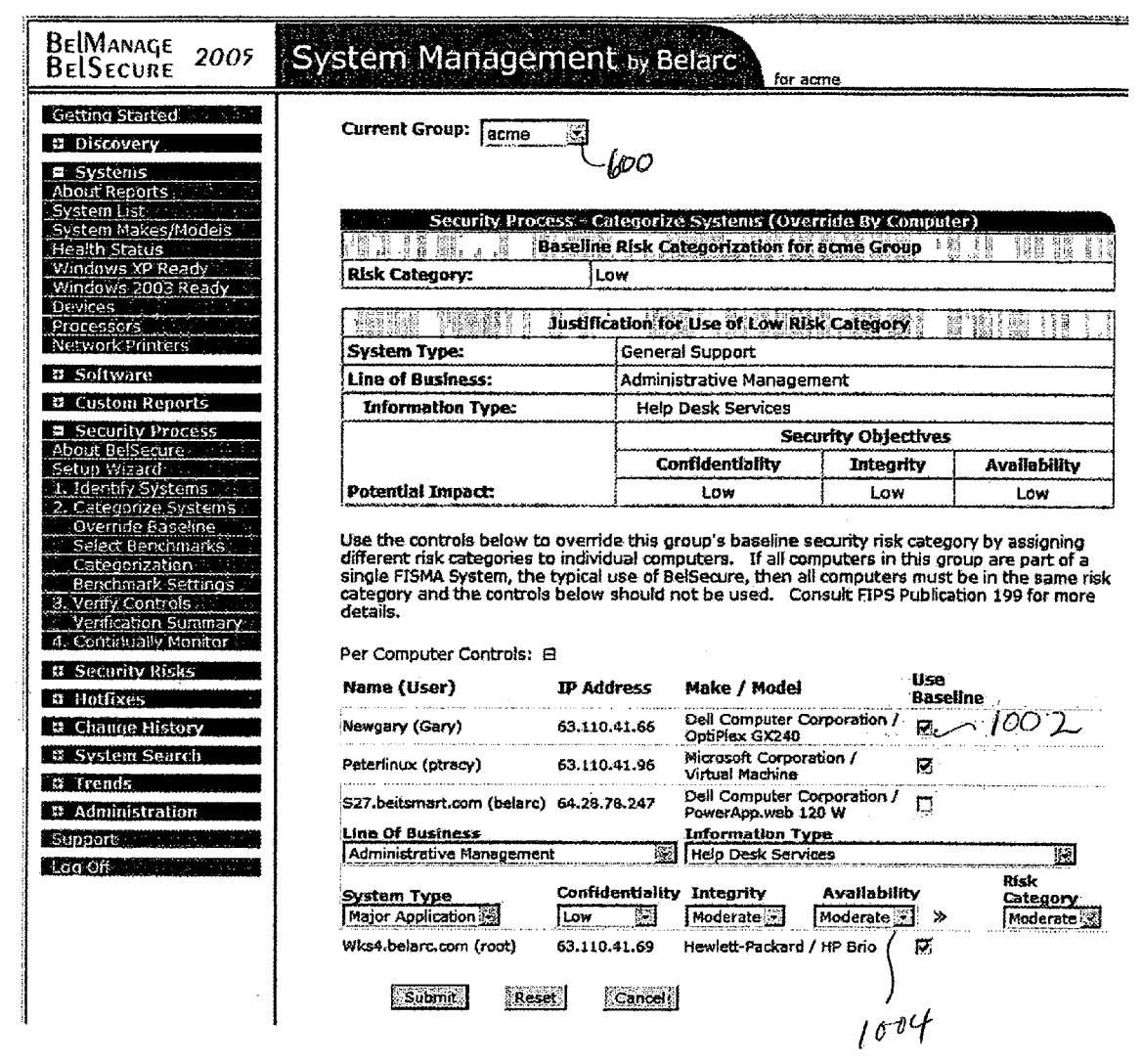

Referring now to FIG. 10, an overall system administrator or a group administrator, as appropriate, may override the baseline risk category for selected computers within a group using an Override By Computer administrative web page. As illustrated, the web page depicts the baseline risk categorization for the designated group, here the Acme group. The Acme group, which is a general support system type, an administrative management line of business and help desk services information type is assigned a low risk category. The computers in the acme group are listed on the page and there is an option to select or de-select use the of the group baseline risk category for the respective computers by checking or unchecking boxes 1002. By default, the boxes 1002 are all checked, such that all of the computers in the group are assigned the baseline risk category that is assigned to the group by the security control manager.

As shown in the drawing, the first two listed computers and the fourth listed computer have the option to use the baseline risk category selected and the third listed computer has the option de-selected. The third computer will thus be assigned a risk category based on the system type, line of business/ information type and potential impact settings selected by the administrator for the computer using the pull down menus 1004. As illustrated, the third listed computer, s27.beitsmart.com, is assigned a moderate baseline risk category.

The settings selections for the de-selected computer set forth in the Override By Computer administrative web page are saved in a Benchmarks By Profile table (not shown) that includes fields for computer UUID and for the respective system type, line of business type, information type and potential impact settings. The security control manager 240 first enters the Benchmarks By Profile table to determine, for a given computer 10, if there has been an override of the baseline risk category that is assigned to the group of which the computer is a member. If so, the security control manager informs the computer, or more specifically the resident security verifier 24, to use the listed benchmark security level for the security compliance testing. If there is no entry for the computer in the Benchmarks By Profile table, the security control manager enters the Benchmark Security Level table 350, which is arranged by group, to determine which benchmark security level is associated with the computer through its group membership.

The Override by Computer option may be used, for example, for a server in a group that is composed predominantly of desktop computers that use or manipulate information that is not particularly sensitive. In such a group, damage to the integrity and/or availability of the information may have a greater impact on the company operations than a breach of confidentiality. Accordingly, the security control settings for the server only may be raised from low to moderate, as shown in FIG. 10, and the baseline risk category assigned to the server only is thus also raised from low to moderate.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention, including assigning risk categories to the computers in any manner, monitoring compliance by requiring an administrator or script invoked clientless profiling application to perform the security control verification each time the application creates a profile of the computer and utilizing one or more processors to perform any or all the functions performed by the security control verification and monitoring subsystem.

What is claimed is:

1. A security control verification and monitoring subsystem for use with a managed computer system, the security control verification and monitoring subsystem including:
   A. a security control manager for
      assigning respective security risk categories to groups of computers,
      consisting of two or more computers, for all computers in the managed computer system,
      associating benchmark security levels with the risk categories for:
      respective groups of computers;
      directing a computer within a given group as to the benchmark security level the computer should use for security compliance testing;
   B. client profilers associated with respective computers in a group of computers, the client profilers periodically uploading the computer profile data to an associated computer information database, and
   C. a security verifier associated with a given computer in a given group for retrieving benchmark definition files that correspond to the benchmark security level specified by the security control manager and selected attributes of the computer that are based upon the computer profile data of the computers that are contained within the database, the security verifier automatically changing which benchmark definition files are retrieved to correspond to changes in the selected attributes of the computer without user modification of benchmark tests and settings per computer;
   performing a security verification operation using the retrieved benchmark definition files periodically, and
   reporting the results of the security control verification operation to the security control manager.

2. The subsystem of claim 1 wherein the security manager further produces reports that detail or summarize the results of the security verification operations for the given computer, the group of computers of which the given computer is a member, or a plurality of groups of computers.

3. The subsystem of claim 2 wherein
   the security control manager includes computer profile data in the reports.

4. The subsystem of claim 3 wherein the subsystem monitors the compliance of respective computers with the associated benchmarks by performing security verification operations and reporting the results to the security control manager whenever the client profiler provides profile data to the security control manager, the subsystem retaining the results in a computer information database that also contains the computer profile data.

5. The subsystem of claim 4 wherein the security control manager and the security verifier operate together to perform the security verification operations, the security control manager directing the security verifier to the benchmark definition files based on the associated benchmark security level and selected attributes determined from the computer profile data contained in the database, and the security verifier using the benchmark definition files to determine if security control settings on the computer comply with or fail to comply with the associated benchmark security level.

6. The subsystem of claim 1 wherein the security control manager constructs a user interface for use by the overall system administrator or the group administrator, to select for the respective groups, mappings of the benchmark security levels to the security risk categories.

7. The subsystem of claim 6 wherein the security control manager further
constructs a user interface for use by said overall system administrator or the group administrators to selectively set system type and business or information type settings and potential impact settings for the respective groups, and
uses one or more of the submitted settings to assign the risk categories to the respective groups.

8. The subsystem of claim 6 wherein the security control manager informs the security verifier of the applicable benchmark security level each time a security verification operation is performed.

9. The subsystem of claim 5 wherein the security control manager directs the security verifier to the benchmark definition files each time a security verification operation is performed.

10. The subsystem of claim 1 wherein the benchmark security levels include one or more custom levels, and one or more of the benchmark definition files correspond to the one or more custom benchmark security levels.

11. A method for monitoring security control verification in a managed computer system, the method including:
assigning security risk categories to groups of computers, groups being two or more computers;
for the respective groups, mapping benchmark security levels to the risk categories;
associating a given computer with the benchmark security level associated with the group to which the computer belongs, an administrator overriding the mapping of the respective security risk category for a group, a subset of a group or a respective computer with a new mapping;
associating a given computer with a client profiler that is configured to periodically upload computer profile data about the computer to an associated database;
selecting benchmark definition files that correspond to the associated benchmark security level and selected attributes of the given computer, the attributes being selected information of the computer based upon said computer profile data of the computer;
automatically changing which benchmark security definition files are retrieved to correspond to changes in the selected attributes of a computer without user modification of benchmark tests and settings of the computer;
comparing the security control settings of the given computer with the settings of the selected benchmark;
continuously monitoring the security control verification system and implementing changes in the security risk categories and benchmark definition files, based upon the new mapping, including associating a given computer with the benchmark security level associated with the group to which the computer belongs, automatically changing which benchmark definition files are retrieved to correspond to changes in selected attributes of a computer, and comparing the security control settings of the given computer with the settings of the selected benchmark as part of periodic computer profile updating operations; and
reporting the results of the comparisons, the computer profile data being included in the reports.

12. The method of claim 11 wherein the step of associating security benchmark levels includes using overall system or group administrator selected mappings.

13. The method of claim 12 wherein the step of assigning security risk categories includes using one or more overall system or group administrator selected settings of potential impact, system type and business or information type.

14. The method of claim 11 wherein the step of reporting includes providing a summary of system, group or computer security control compliance results.

15. The method of claim 11 wherein the step of reporting includes storing the results in a computer information database and including the results in a summary of system, group or computer profile data.

16. The method of claim 15 wherein the step of selecting benchmark definition files for a given computer includes utilizing computer profile data provided by the computer as part of profile data updating operations to determine the attributes of the computer and directing the computer to the appropriate benchmark definition files.

17. A security control manager for controlling security verification operations in a managed computer system, the security control manager including:
one or more processors configured to assign security risk categories to respective groups of computers, groups being two or more computers, and for the respective groups associating the risk categories with benchmark security levels;
the one or more processors further configured to select the benchmark security level for use by a given computer based on the security risk category assigned to the group of which the computer is a member and the benchmark security level associated with the assigned risk category for the group;
the one or more processors further configured to communication with an associated database that is periodically updated by the uploading of computer profile data to by client profilers;
the one or more processors further configured to monitor the security control verification system and implementing changes in the security risk categories and benchmark definition files;
the one or more processors further configured to provide one or more interfaces though which an overall system administrator or a group administrator selects a mapping of security risk categories to benchmark security levels for one or both of respective groups and respective computers within a given group;
the one or more processors further configured to provide one or more interfaces through which an administrator overrides said respective security risk categories and said benchmark security level settings for a group of computers, a subset of a group of computers, and an individual computer; and the one or more processors further configured automatically apply the mapping to those computers without user modification of benchmark tests and settings per computer.

18. The security control manager of claim 17 wherein the one or more processors are further configured to provide one or more interfaces through which the overall system or group administrator to selects system type and business or information type settings and potential impact settings on which the risk category assignments are based.

19. The security control manager of claim 17 wherein the one or more processors are further configured to enter a computer information database to retrieve the computer attributes and direct a given computer to appropriate benchmark definition files.

20. The security control manager of claim 19 wherein the one or more processors are further configured to communication with the computer information database to store results of the security verification operations as pass or fail data in the computer information database.

21. The security control manager of claim 20 wherein the one or more processors are further configured to selects the benchmark security level as part of each security verification operation.

22. The security control manager of claim 21 wherein the security control manager monitors the security control compliance of the respective computers by participating in security verification operations each time the respective computers update the computer profile data.

23. The security control verification and monitoring subsystem for use with a managed computer system as defined in claim 1, wherein a new computer that is added to the system is verified and monitored as soon as the computer is assigned to a group, and is automatically assigned a benchmark security level belonging to the group, or a benchmark security level that differs from the group based upon one or more selected attributes of the new computer.

* * * * *

UNITED STATES PATENT AND TRADEMARK OFFICE
CERTIFICATE OF CORRECTION

PATENT NO. : 8,225,409 B2  
APPLICATION NO. : 11/387424  
DATED : July 17, 2012  
INVENTOR(S) : Gary H. Newman et al.

It is certified that error appears in the above-identified patent and that said Letters Patent is hereby corrected as shown below:

In the Drawings:
Please replace Figures 6-10 with the following figures attached hereto.

In the Claims:
At Column 12, in Claim 17, line 60 delete "though" and insert --through--;
At Column 13, in Claim 18, line 11 after administrator delete "to";
At Column 14, in Claim 21, line 4 delete "selects" and insert --select--.

Signed and Sealed this
Fourteenth Day of May, 2013

Teresa Stanek Rea
*Acting Director of the United States Patent and Trademark Office*

FIG. 6

Security Control Verification by Computer

Computer Name: W2k3cistest-dc (in CISTEST)
Group: belarc\TestProfiles\
Profile Date: Thursday, February 03, 2005 09:19:00 AM -0500
Windows Logon: belarc-admin
Client Version: 7.0h Score: 6.87 of 10
Risk Category: Low
Benchmark: CIS Win2003 Domain Controller Legacy version 1.1

Benchmark Results by Section and Setting (* = Pass, X = Fail)

- Current Service Pack
  - 1. Latest Service Pack
- Critical and Security Hotfixes
  - 1. Latest Critical and Security Hotfixes
- Password Policies
  - 1. Current Password Ages
  - 2. Minimum Password Length
- Audit and Account Policies
  - 1. Audit Account Logon Events
  - 2. Audit Account Management
  - 3. Audit Logon Events
  - 4. Audit Object Access
  - 5. Audit Policy Change
  - 6. Audit System Events
  - 7. Minimum Password Age
  - 8. Maximum Password Age
  - 9. Password Complexity
  - 10. Store Passwords using Reversible Encryption
  - 11. Password History Size
  - 12. Account Lockout Duration
  - 13. Account Lockout Threshold
  - 14. Reset Account Lockout Count Time

FIG. 8

FIG. 10